(12) United States Patent
Singh et al.

(10) Patent No.: US 7,788,280 B2
(45) Date of Patent: Aug. 31, 2010

(54) METHOD FOR VISUALISATION OF STATUS DATA IN AN ELECTRONIC SYSTEM

(75) Inventors: Raghavendra Singh, New Delhi (IN); Anindya Neogi, New Delhi (IN); Bharat Krishnamurthy, Bangalore (IN); Ravi Kothari, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/940,680

(22) Filed: Nov. 15, 2007

(65) Prior Publication Data

US 2009/0132555 A1    May 21, 2009

(51) Int. Cl.
*G06F 17/00* (2006.01)

(52) U.S. Cl. .................. 707/791; 707/801; 707/822; 707/828

(58) Field of Classification Search .......... 707/600–831
See application file for complete search history.

(56) References Cited

U.S. PATENT DOCUMENTS

| | | | |
|---|---|---|---|
| 6,496,208 B1 | 12/2002 | Bernhardt et al. | |
| 6,509,898 B2 | 1/2003 | Chi et al. | |
| 6,888,554 B1 | 5/2005 | Decombe | |
| 6,944,830 B2 | 9/2005 | Card et al. | |
| 7,046,247 B2 | 5/2006 | Hao et al. | |
| 2006/0095858 A1 | 5/2006 | Bartek et al. | |
| 2006/0129569 A1 | 6/2006 | Dieberger et al. | |
| 2006/0190448 A1 | 8/2006 | Bartek et al. | |
| 2007/0255748 A1* | 11/2007 | Ferragina et al. ............ 707/102 |

* cited by examiner

*Primary Examiner*—Isaac M Woo
(74) *Attorney, Agent, or Firm*—Gibb I.P. Law Firm, LLC

(57) ABSTRACT

A method is disclosed for facilitating visualisation of status data in an electronic system. The status data comprises metadata including a plurality of information context categories. The status data also comprises data nodes, each data node including specific instances of a respective context category. The method starts with selecting possible data combinations and permutations of the information context categories, each permutation defining a respective hierarchy. For each permutation, information content of data for each node of the respective hierarchy is estimated and an informative tree and total entropy for all informative nodes are found. The permutation and the informative tree that has the lowest total entropy are then presented to the user.

13 Claims, 4 Drawing Sheets

METHOD FOR VISUALISATION OF STATUS DATA IN AN ELECTRONIC SYSTEM

FIELD OF THE INVENTION

The present invention relates to a method for visualisation of status data of an electronic system and, in particular, to a method for visualisation of status data in large IT infrastructures.

BACKGROUND OF THE INVENTION

In enterprises with large IT infrastructures, monitoring of infrastructure elements (servers, applications, network elements etc.) is necessary to ensure that any infrastructure problem is detected as quickly as possible. Examples of monitored status data entities include the latency of a process, the availability of a server and the throughput of an application. "Normal" or desirable behaviour may be associated with the monitored data and deviation from the desirable behaviour could be arranged to trigger an "event" which is brought to the attention of an operator or otherwise used to bring the monitored entity to the "normal" state. As a large number of entities are usually monitored, an integrated console (also known as a dashboard) is often used to facilitate the monitoring of the current state of the system. Given the large number of monitored entities, it is desirable that the dashboard prioritizes information so that the information is easy to navigate.

There are many dashboards currently available on the market. Some available dashboards are specific to the systems management environment, while others can be used as visual consoles in many different environments. Most of the dashboards provide features such as customizable interface, alarm displays, hierarchical view of performance metrics, ability to drill down to details, graphing/trending capability etc.

Most systems management dashboards systematically organize the sensed (measured) data and the state, by displaying the data/state within an appropriate context. Examples of context are the metric name, the process name, the application name, the name of the server on which the application is running, the line of business under which the application is running etc. If latency of process A, running on server B, was being measured, the context associated with the value could be the string <Metric latency><Process A><Server B>. Here Metric, Process and Server are context categories or meta-data, while latency, A, B are context value or instances.

It should, however, be appreciated that the above discussed representation is only one possible representation of the contextual relationship between the various data levels. Each context value can be considered as a node in a graph, and depending upon the "topology" of the data centre, there could be many ways in which this graph could be connected or organized, e.g. a server may have many different applications running, each application may be accessing the same database etc. Here it is assumed that any of these connected graphs can be mapped to a hierarchical graph where each level of the hierarchy corresponds to a context category and nodes in the level correspond to context values associated with the category. An example of such a hierarchy is shown in the dashboard view snapshot of FIG. 1. The context categories or metadata are Line of Business (LOB) 11, Service 12, Location 13, Application 14, Server 15, and Metric 16. The actual context values, which are not numbered for simplicity, are CreditCards for LOB, Billing for service, and EMEA, AP, US for location. The applications being monitored are PrintBill and Rating, while jupiter, neptune, ganga, etc. are servers. Finally qsize/db, availability/process, utilization/cpu are instances of metric. The mapping of an arbitrary connected graph to a hierarchical view can be done trivially by replicating the shared nodes.

Time series data, consisting of measurement samples, is associated with each level of the hierarchy. While the "leaf" data is always the measured data, i.e., data from the monitoring system; the data at a higher "node" in the tree could be measured data or aggregated data. Given the selection and ordering of the context categories in the above example, the metric data 16 is grouped by server 15, applications 14, locations 13, services 12 and LOB 11, in that nesting order. Thus the data at the node jupiter could be an aggregation of the metric 16 data corresponding to the measurements of availability/process, availability/connectivity, qsize/db, utilization/cpu and qsize/os. The user could supply aggregation functions, or they could be built-in functions that could aggregate by doing simple operations like union, intersection, addition etc.

In large enterprises the number of entities that are being constantly measured is very large. There are many possible context categories or meta-data items and with each metadata there would be a large number of instances or values. Thus the default hierarchy, in which all meta-data are selected and ordered, would be also very large. Not all nodes in the hierarchy would be equally informative, i.e., the entropy of data corresponding to the nodes would be different. Also the meta-data selection and ordering could be changed to generate a different hierarchy with nodes that convey different information. Finding the right hierarchy and then traversing the hierarchy to find which nodes to observe closely can be a very difficult and time consuming navigational process. Accordingly it is desirable that a dashboard offers the user a prioritised view including navigation help beyond selection and drill up/down, in order to help the user to identify which particular time series should be observed more closely and in what context should they be observed.

SUMMARY OF THE INVENTION

According to one aspect of the invention, there is provided a method for facilitating visualisation of status data in an electronic system, the status data comprising metadata, the metadata including a plurality of information context categories, and data nodes, each data node including specific instances of a respective context category. The method comprises the steps of selecting possible data combinations and permutations of the information context categories, each permutation defining a respective hierarchy. For each permutation performing; estimating information content of data for each node of the respective hierarchy; finding an informative tree; finding total entropy for all informative nodes and presenting a permutation and an informative tree with a lowest total entropy to the user.

According to another aspect of the invention, there is provided a first electronic system for facilitating visualisation of status data in a second electronic system. The first electronic system has access to the status data of the second electronic system. The status data comprises metadata, including a plurality of information context categories, and data nodes, each data node including specific instances of a respective context category. The first electronic system comprises computational means configured for selecting possible data combinations and permutations of the information context categories, each permutation defining a respective hierarchy; and, for each permutation, estimating information content of data for each node of the respective hierarchy; finding an informative tree; finding total entropy for all informative nodes and presenting a permutation and an informative tree with a lowest total entropy to the user.

According to a further aspect of the invention, there is provided a computer program comprising executable code for effecting the method according to the first aspect of thee invention.

In a further aspect, a computer program product is provided having a computer readable medium with an executable computer program recorded therein, for effecting the method according to the first aspect of thee invention.

DETAILED DESCRIPTION

A method and an associated electronic system are disclosed that automatically generate an optimised dashboard view that increases the amount of information available to the user in the limited viewing space of the dashboard (GUI window). This allows a user to access informative data in a prioritized manner, thus saving navigational effort and time. The system and method use the concept of entropy to measure the amount of information of the current data being displayed in a dashboard (see "*Elements of Information Theory*", Cover and Thomas, Wiley, 1991). The prioritization logic is integrated with an existing dashboard by way of respective executable code.

The described system and method provide a list of paths from the root of the hierarchy that the user should focus on, i.e. the goal of the algorithm is to find among the set of possible trees (hierarchies), generated by all permutations and combinations of the meta-data, the smallest possible hierarchy that gives the maximum amount of information, herein referred to as the "informative tree". It should be understood that, depending on the evaluation method, the range of possible hierarchies could be somewhat uncertain. Accordingly, the term "the smallest possible hierarchy" is used here not in an absolute term, but in a relative term—to indicate a minimised hierarchy. The amount of information is estimated by using the data associated with the nodes, as a measure of the difference between the currently observed time series and a predetermined "expectation" data. The "expectation" data is derived from historical data analysis, e.g., by generating a probability distribution function or "expectation" patterns. Once the information content for each node has been estimated, the informative tree can be found using methods such as minimum description length (MDL) (see *The Minimum Description Length Principle in Coding and Modelling*, by A. Barron, J. Rissanen and B. Yu, IEEE Transactions. on Information Theory, October 1998, pp 2743-2760). The total information content for the informative tree is computed and these steps are repeated for each possible combination and permutation of the meta-data. Thus for each ordering an informative tree is found. This is the smallest hierarchy with maximised total information content is displayed to the user.

Figure 1:
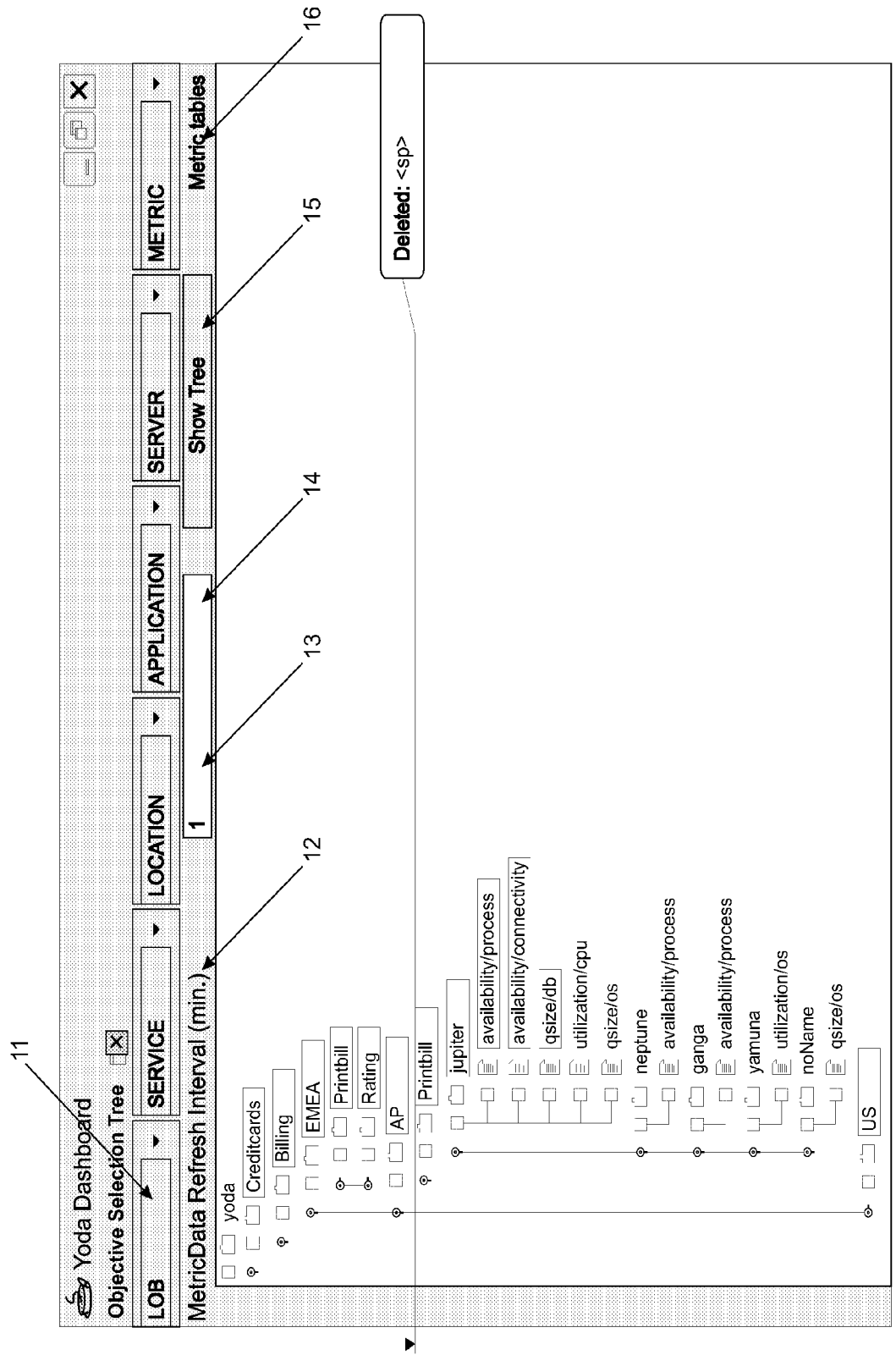
FIG. 1 shows a snapshot view of a dashboard, the view illustrating a hierarchical data structure.
Figure 2:
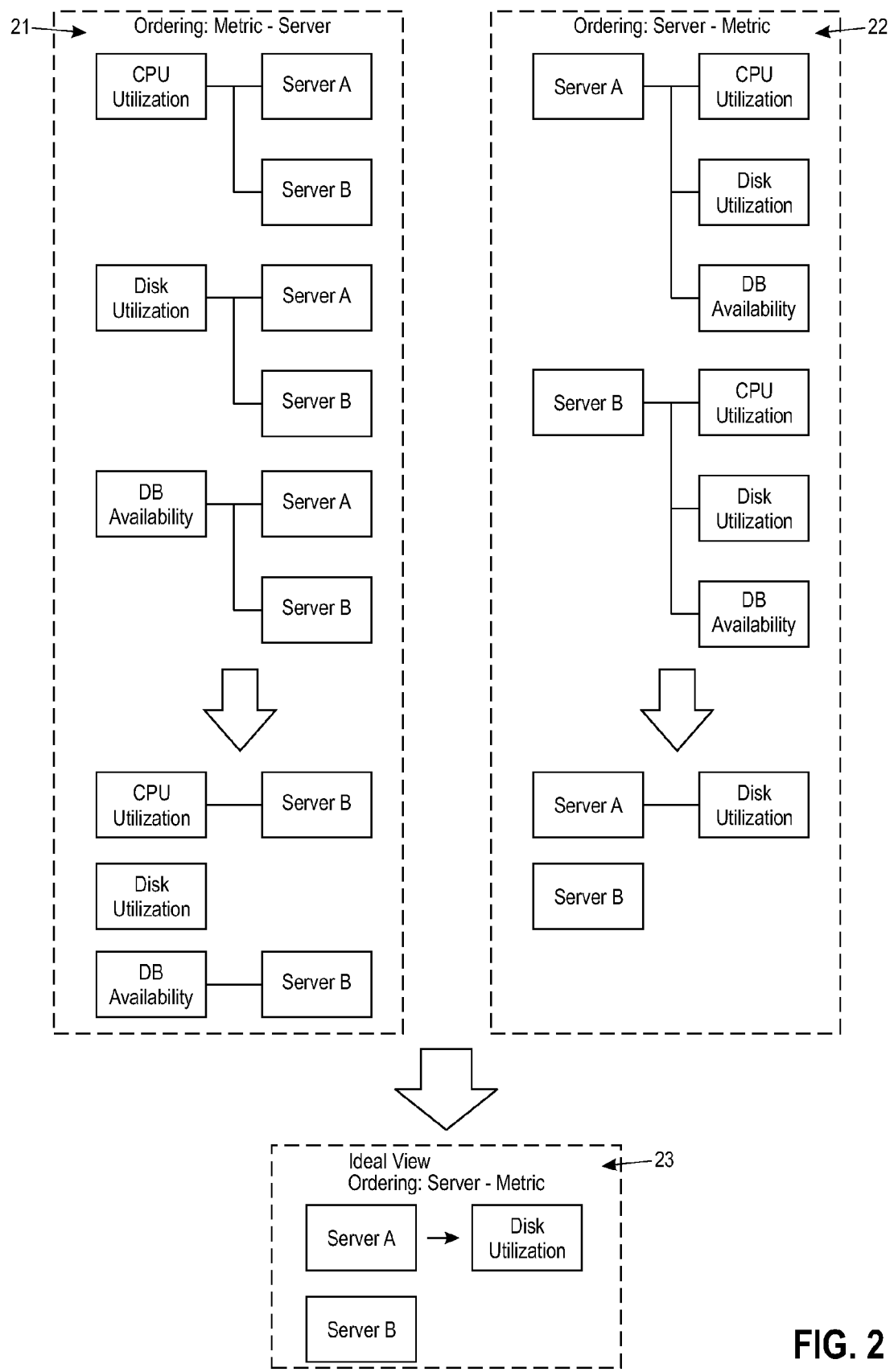
FIG. 2 shows a schematic illustration of a process of visualisation optimisation based on two hierarchical views with alternative meta-data ordering.

FIG. 2 illustrates the method with a specific example. View 21 of FIG. 2, illustrates a scenario where the user has chosen metric-server as the meta-data tags, in that specific nesting order. In the following description, it would be assumed that there are events in all servers for the metric disk/utilization, and for all metrics in server B. Rather than observing each alert separately it would be more efficient for the user to observe a single alert with respect to the node disk/utilization. This would inform the user that that there is an issue with the shared storage infrastructure across all servers. There is a difference between alert and event. While an event is generated by the monitoring server, an alert is a mechanism to notify the user that an event has happened. Alerts could be generated by monitoring server or by the dashboard and could be composed of more than one event. In the case of the above example, if all metrics across all servers are facing "event" situations then a single alert at the application node would convey a larger amount of information in the shortest "viewing space" to the user.

View 21 of FIG. 2 does not clearly convey to a user the fact that all metrics of server B are having events, as servers are grouped under metric. Reordering of the meta-data tags to server, within the metric grouping, clearly indicates to the user that all metrics of server B are having events, by presenting a single alert on node server B. This is important for identifying the fact that the most probable cause for the problems with the server B it is not an issue with an individual metric, but with the server itself. This is shown in View 22 of FIG. 2. A comparison between View 21 and View 22 would reveal that that, by drawing the shortest tree, View 23 would be the more informative view and, therefore, take up a smaller viewing space.

Figure 3:
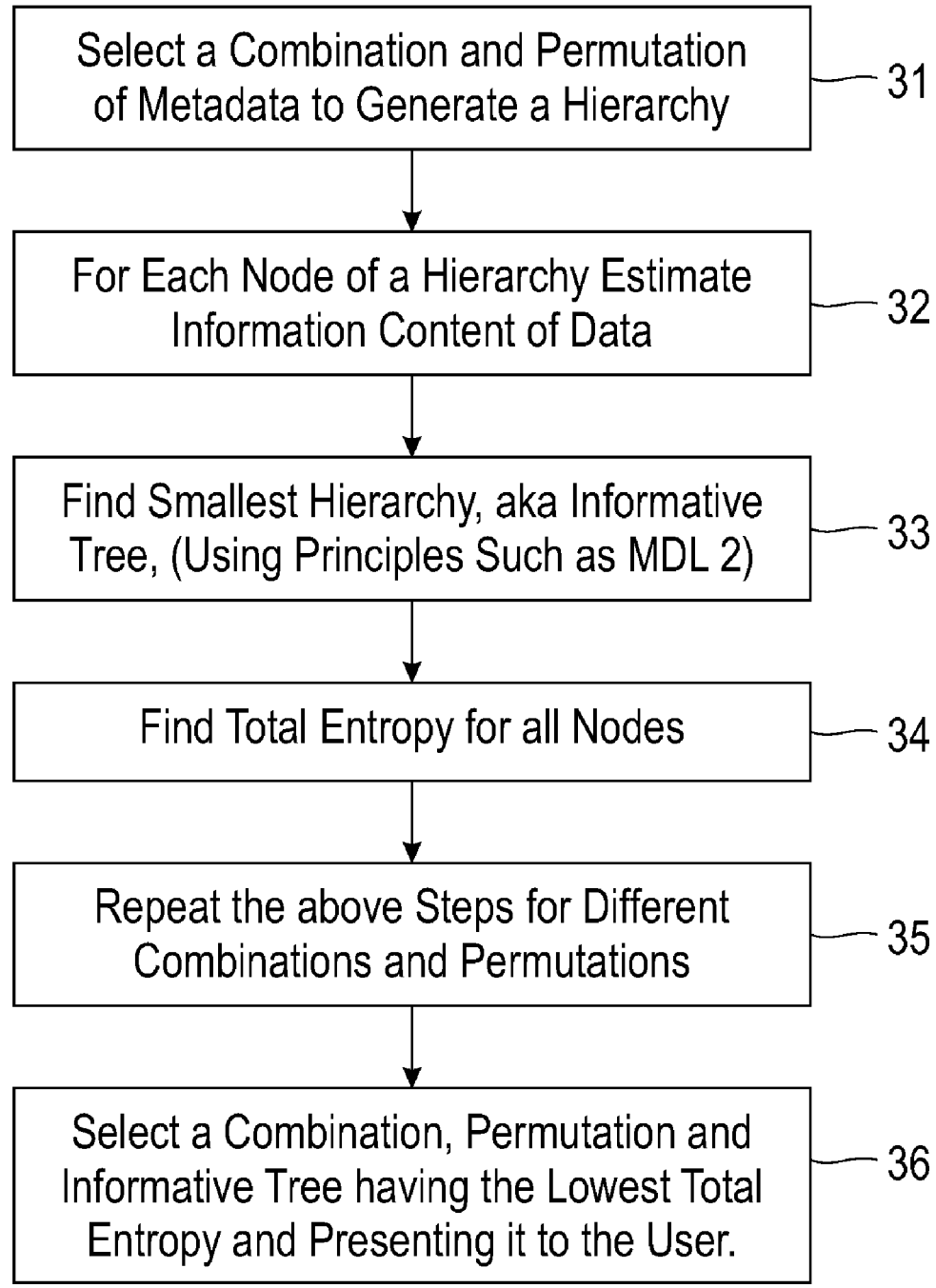
FIG. 3 shows a schematic flow diagram of the process of status data visualisation illustrated in FIG. 2.

A pseudo code for the above illustrated method for generating informative views in a system's management dashboard is shown in FIG. 3. An important step in the method involves measuring the information content of the measured data by using the data associated with a respective node and the relationship of the source of the data with the source of the data at other nodes (step 32 in FIG. 3). Once this is done, an informative tree can be found (step 33) using principles such as the minimum description length principle (MDL 2). These steps are repeated for other combinations and permutations (steps 31 and 35). Finally, the shortest spanning tree is identified in step 36. The permutation and the shortest spanning tree with the lowest total entropy are then presented to the user. The method is agnostic to context representation as long as the context is available with the measured data at the dashboard.

In the above described method for generating the informative view, the information content is estimated using historical data analysis. In the scenario that this estimation was happening when the system was in an "event" state, the estimation could be done by generating a probability mass function using the count of events in the historical time series and then finding the entropy of the current event given the probability mass function. The entropy is the information content in this scenario.

Information content can also be estimated in the scenario when the entity is in a normal state, i.e., when there are no events. Indeed the problem of finding nodes to focus on is more essential when there are no explicit events occurring in the system to help guide the user navigation. The "event" states of an electronic system are defined by the user. However, even if the status report shows that the system is in normal state; the current measurement data may deviate sufficiently from the historical data for it to be informative to the user. For example, in case where the typical utilization trend for a server is of sinusoidal nature, if the currently observed trend becomes non-sinusoidal, e.g. saw-tooth, the user may be interested in focusing on this altered pattern in the time series. The disclosure below describes a method for estimating information content using patterns in time series measurements pertaining to monitoring data captured from the managed system.

Typically events are generated when a measured (or computed) variable deviates from a defined "set point". Set point is defined as a set of chosen data samples contiguous in time (or space). Typically, such set points are simple scalar values (e.g. when CPU utilization is greater than a threshold, then generate event). In many situations, metrics have a quasi periodic nature (e.g. batch jobs) and such scalar set points are inadequate. In the proposed method, rather than a scalar set point, a vector set point (in space and/or time) is defined and the deviation from the defined set point is used to estimate the information content.

Figure 4:
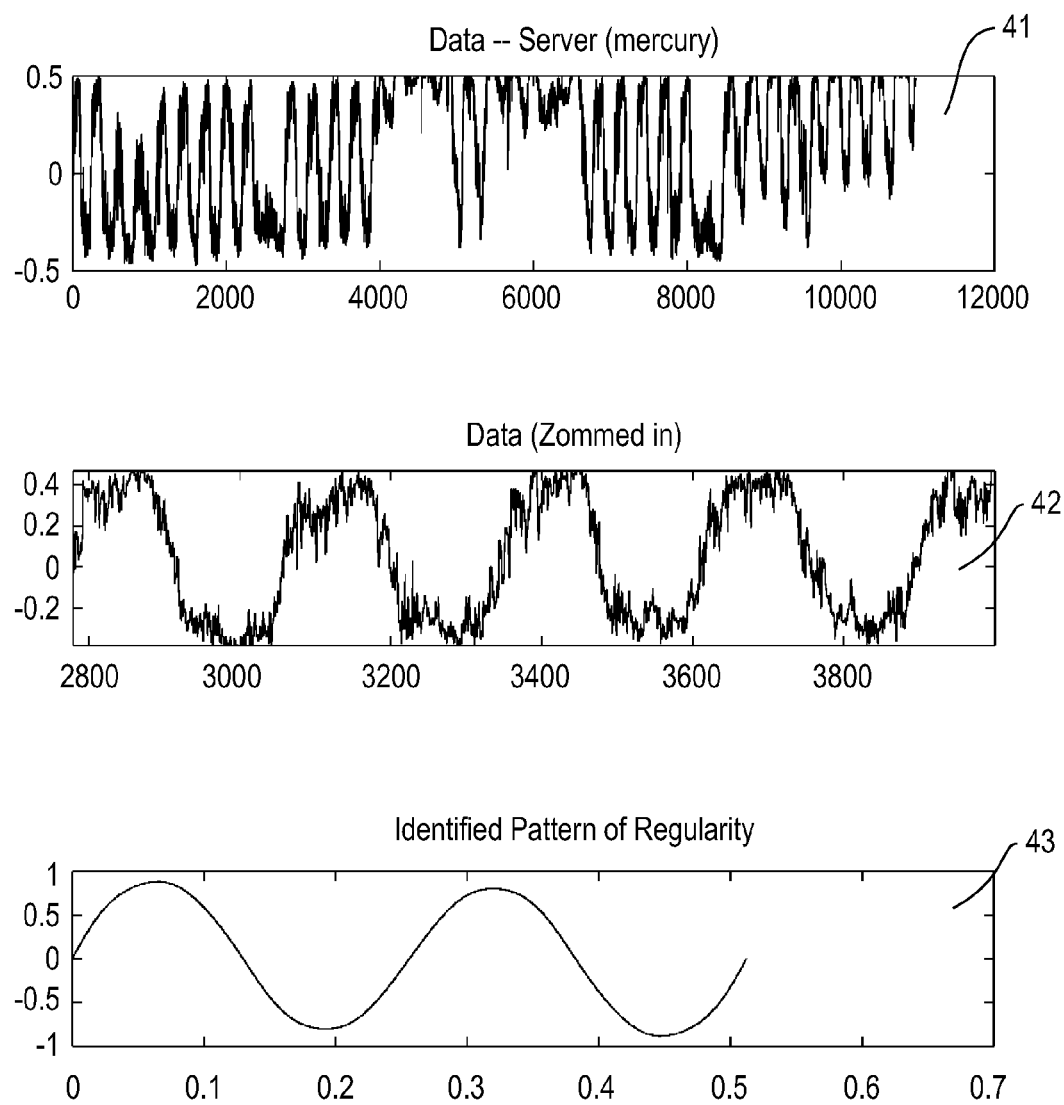
FIG. 4 shows a normalised CPU utilisation of a server.

For example, graphs 41 and 42 in FIG. 4 show different time domains of a normalized CPU utilization of a server. If the event generation level is, say 99% (0.49 in FIG. 4), this would lead to a large number of "events" being identified. Also, the fact that the CPU reaches 99% may not even be abnormal. Thus, using discrete values to measure information content may not be very useful. On the other hand, the time series of the CPU utilization of most servers exhibit typical patterns. For example, the particular CPU shown in graph 43 of FIG. 4 historically follows a sinusoidal pattern. A deviation from this pattern could convey useful information to the user. Thus, if the CPU utilization starts generating a saw tooth pattern, the user would be interested in observing this time behaviour. Accordingly, a method is proposed that uses set point patterns to estimate information content that includes the following steps. The method comprises two main steps.

The first step is to apply historical data analysis to find the set point pattern in a time series. Such analysis includes observing the data behaviour over representative periods of activity/time, using robust statistics to filter out spontaneous variations, using frequency domain and optimization techniques to find regularity, and using the detected regularity to form patterns. The patterns are usually context dependent. Thus, the patterns are either based on time or another metric. Finally, the identified patterns are stored as one or more rules.

The second step is to use the set point pattern to estimate the deviation from set point pattern in the current time series. This step comprises the steps of using the stored patterns and current pattern to estimate information theoretic distance. This allows the identification of the node where distance is the most. Running statistics is then computed to invoke incremental pattern adaptation.

The information content estimated by the above described method can then be used by the method for generating informative views to facilitate optimised visualisation of the status of the respective electronic system.

It is obvious from the above description that, whilst the disclosed method for facilitating visualisation of status data in an electronic system and the method using set point patterns to estimate information content, are generally designed to be executed by one or more processors, residing on a single computer or other electronic device, or in a distributed electronic system. Accordingly, the above described methods are closely associated with such computer and/or other electronic system/s, as well as with the corresponding executable code that, upon execution, affects the various steps of the discussed methods on the respective processor/s. The executable code is typically stored on some form of storage medium, such as hard drive and read-only memory, or resides in portable carriers, such as CD-s and DVD-s.

We claim:

1. A computer-implemented method for facilitating visualisation of status data in an electronic system, the status data comprising metadata, the metadata including a plurality of information context categories, and data nodes, each data node including specific instances of an information context category, the method comprising:

selecting, by a computer, all possible data combinations and permutations of the information context categories, each data combination and permutation defining a respective hierarchy; and for the each data combination and permutation performing by said computer:

estimating information content of data for each node of the respective hierarchy;

finding an informative tree corresponding to the respective hierarchy;

finding total entropy for all informative nodes in the informative tree; and presenting a data combination and permutation corresponding to the informative tree with a lowest total entropy to the user.

2. The method of claim 1, wherein the estimating information content of data for each node of the respective hierarchy comprises:

using electronic system data history analysis to establish historical set point patterns in measurement time series; and computing a deviation of set point patterns in a current time series from the historical set point patterns.

3. The method of claim 2, wherein the using electronic system data history analysis to establish historical set point patterns in measurement time series, includes:

observing behaviour of data over representative periods of activity/time; and filtering spontaneous variations observed in the data.

4. The method of claim 3, wherein the filtering comprises:

using frequency domain and optimization techniques to find regularity;

using any detected regularity to form patterns; and storing the patterns as one or more rules.

5. The method of claim 4, wherein the formed patterns are time-based.

6. The method of claim 2, wherein the computing the deviation of the set point patterns in current time series from the historical set point patterns, includes:

using stored patterns and current patterns to estimate a distance measure;

finding a node where the distance measure is the largest; and computing running statistics to invoke incremental pattern adaptation.

7. A computer system for facilitating visualisation of status data in an electronic system, the status data comprising metadata, the metadata including a plurality of information context categories, and data nodes, each data node including specific instances of an information context category, the system comprising:

a memory for storing the status data; and a processor configured to:

select all possible data combinations and permutations of the information context categories, each data combination and permutation defining a respective hierarchy; and for the each data combination and permutation, estimate information content of data for each node of the respective hierarchy;

find an informative tree corresponding to the respective hierarchy;

find total entropy for all informative nodes in the informative tree; and present a data combination and permutation informative corresponding to the informative tree with a lowest total entropy to the user.

8. The system of claim 7 wherein the estimate of the information content of data for each node of the respective hierarchy comprises:

using electronic system data history analysis to establish historical set point patterns in measurement time series; and computing a deviation of set point patterns in a current time series from the historical set point patterns.

9. The system of claim 8, wherein the using electronic system data history analysis to establish historical set point patterns in measurement time series comprises:

observing behaviour of data over representative periods of activity/time; and filtering spontaneous variations observed in the data.

10. The system of claim 9 wherein filtering comprises:

using frequency domain and optimization techniques to find regularity;

using any detected regularity to form patterns; and storing the patterns as one or more rules.

11. The system of claim 10, wherein the formed patterns are time-based.

12. The system of claim 8, wherein the computing the deviation of the set point patterns in current time series from the historical set point patterns comprises:

using stored patterns and current patterns to estimate a distance measure;

finding a node where the distance measure is the largest; and computing running statistics to invoke incremental pattern adaptation.

13. A computer program storage medium readable by computer, tangibly embodying a program of instructions executable by said computer for effecting a method for facilitating visualisation of status data in an electronic system, the status data comprising metadata, the metadata including a plurality of information context categories, and data nodes, each data node including specific instances of an information context category, the method comprising:

selecting all possible data combinations and permutations of the information context categories, each data combination and permutation defining a respective hierarchy; and for the each data combination and permutation performing:

estimating information content of data for each node of the respective hierarchy;

finding an informative tree corresponding to the respective hierarchy;

finding total entropy for all informative nodes in the informative tree; and presenting a data combination and permutation corresponding to the informative tree with a lowest total entropy to the user.

* * * * *